No. 628,508. Patented July 11, 1899.
F. W. WOERNER.
MACHINE FOR TAGGING PLUG TOBACCO.
(Application filed Dec. 3, 1897.)
(No Model.) 8 Sheets—Sheet 1.

WITNESSES:
Carl Schlegel
L. A. Minturn

INVENTOR
Frank W. Woerner.
BY
Joseph A. Minturn
ATTORNEY.

THE NORRIS PETERS CO., PHOTO-LITHO., WASHINGTON, D. C.

No. 628,508. Patented July 11, 1899.
F. W. WOERNER.
MACHINE FOR TAGGING PLUG TOBACCO.
(Application filed Dec. 3, 1897.)
(No Model.) 8 Sheets—Sheet 5.

WITNESSES:
Carl Schlegel
L. A. Minturn

INVENTOR
Frank W. Woerner,
BY
Joseph A. Minturn
ATTORNEY.

No. 628,508. Patented July 11, 1899.
F. W. WOERNER.
MACHINE FOR TAGGING PLUG TOBACCO.
(Application filed Dec. 3, 1897.)
(No Model.) 8 Sheets—Sheet 6.

WITNESSES:
Carl Schlegel
L. A. Minturn

INVENTOR
Frank W. Woerner,
BY
Joseph A. Minturn
ATTORNEY.

No. 628,508. Patented July 11, 1899.
F. W. WOERNER.
MACHINE FOR TAGGING PLUG TOBACCO.
(Application filed Dec. 3, 1897.)

(No Model.) 8 Sheets—Sheet 8.

WITNESSES:
Carl Schlegel.
L. A. Minturn

INVENTOR
Frank W. Woerner,
BY
Joseph A. Minturn
ATTORNEY.

UNITED STATES PATENT OFFICE.

FRANK W. WOERNER, OF INDIANAPOLIS, INDIANA, ASSIGNOR OF ONE-HALF TO JAMES A. HENDERSON, OF DANVILLE, VIRGINIA.

MACHINE FOR TAGGING PLUG-TOBACCO.

SPECIFICATION forming part of Letters Patent No. 628,508, dated July 11, 1899.

Application filed December 3, 1897. Serial No. 660,592. (No model.)

*To all whom it may concern:*

Be it known that I, FRANK W. WOERNER, a citizen of the United States, residing at Indianapolis, in the county of Marion and State of Indiana, have invented certain new and useful Improvements in Machines for Tagging Plug-Tobacco, of which the following is a specification.

This invention relates to machines for forming and affixing tags to plug-tobacco, the object being to provide mechanism which shall be adapted to stamp or cut the tags out of metal, which is fed into the machine in sheets or thin strips, and fix them by a continuous downward movement upon underlying plugs of tobacco without affording any opportunity for the tags to become misplaced after they are formed.

I accomplish the objects of the invention by the mechanism illustrated in the accompanying drawings, in which—

Fig. 3, a detail enlarged view of the stamping mechanism as shown in Fig. 2, but showing the bed of the machine in longitudinal vertical section; Fig. 5ᵃ is a similar view to that shown in Fig. 5, except that the head is partially in section and the parts are in raised position before the forming of the tag; Fig. 14, a side elevation of Fig. 13, and Fig. 15 a perspective view of the metal sheet after the tag has been pushed out.

The table or plate 1, its legs or standards 2, hanger 3, and standards 4 constitute the framework of the machine. Mounted in suitable journals on the tops of the standards 4 is shaft 5, having the pulley 6, which is connected by belt 7 with any suitable source of power. In the hanger 3 turns the shaft 8, carrying the radially-slotted crank-wheel 9. The wrist-pin 10 is adjustably mounted in the radial slot. Mounted on the opposite end of the shaft 8 from the wheel 9 is the beveled cog-wheel 11, and mounted in a suitable boxing supported from the leg of the machine is the shaft 12, having the bevel-wheel 13, which meshes with the wheel 11. The shaft 12 has the sprocket-wheel 14, which is driven by link-belt connection with the sprocket-wheel 15 on the shaft 5.

16 is a hopper mounted on the bed of the machine, and within it the plugs of tobacco 17 are placed flat side up. The bed-plate is slotted longitudinally to allow the tobacco to drop through onto an adjustable support 18. (See Fig. 3.) Sufficient clearance between the support 18 and the hopper is provided to permit the tobacco to be pushed endwise out of the hopper one plug at a time only. An adjustable support for the plugs is required because all brands of tobacco are not of the same thickness, and the space must be regulated to bring the top surface of all plugs of tobacco to the same level. This adjustment is secured by the screws 19, which are fastened at their upper ends to the support 18 and have their lower ends projected through the threaded hand-wheels 20. The hand-wheels are mounted between fixed transverse bars 21 and have only rotary movement. Flanges 22 depend from the bed on each side of the slot, as shown in Fig. 3, and guide the plugs as they are moved longitudinally.

23 is a carriage which is mounted in and slides longitudinally of the slot in the bed. It is connected by the pitman 24 with the wrist-pin 10 on the crank-wheel 9. A bar 25 is secured to the carriage and pushes the plugs of tobacco out of the hopper one at a time with each forward movement of the carriage. By moving the wrist-pin in the radial groove in the crank-wheel the length of travel of the carriage at each stroke can be regulated.

Having now described the mechanism by which the plugs of tobacco are fed through the machine, I will now describe the mechanism whereby the tags are formed and affixed to the plugs.

26 is a plate which is removably and adjustably secured to the top of the bed of the machine and is directly over the plug when the latter stops after being pushed out of the hopper and rests during the return of the carriage with its push-bar. This plate preferably comprises an iron base and a face-plate of steel, the line of demarcation between the two metals being shown by the horizontal line in Fig. 5. By this construction the plate is made cheaper as to first cost and while providing a steel cutting-surface for the die also secures a toughness which would not be secured with an all-steel construction. The plug remains under the plate 26 until it is made to move on by the next following plug. The plate 26 has as many openings through it as it is desired to place tags on the plugs, and these openings are arranged in position immediately over the places where the tags are to be stuck into the plug.

Figure 7:
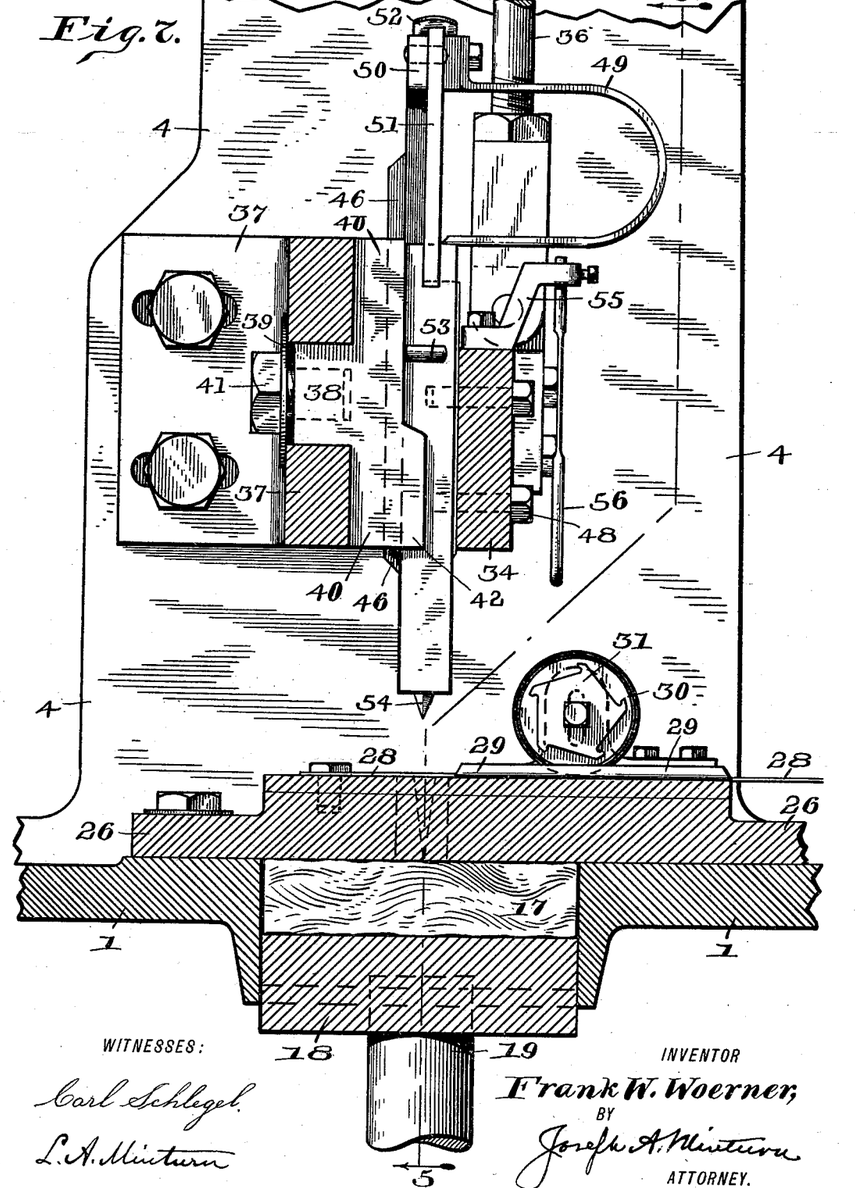
Fig. 7, a vertical section on the line 7 7 of Fig. 5ᵃ looking in the direction of the arrows.
Figure 8:
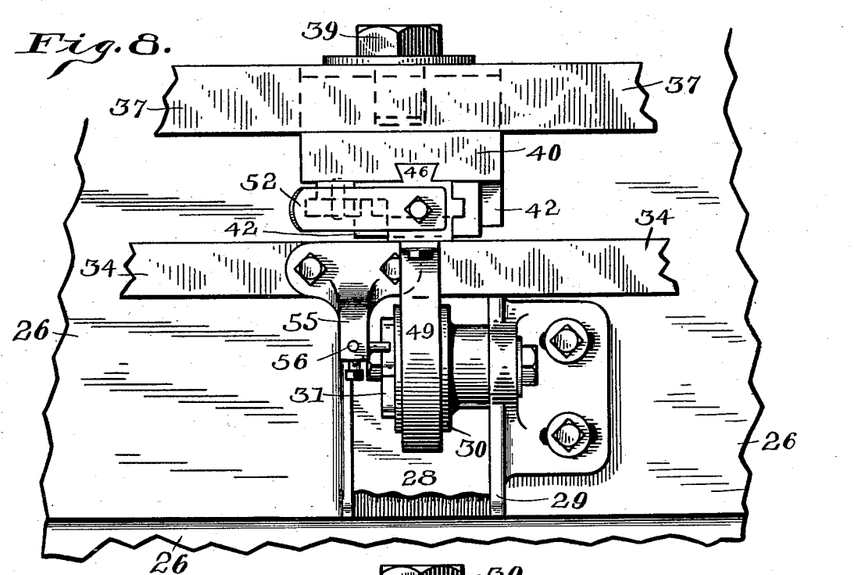
Figs. 8 and 9, horizontal sections looking down from the lines 8 8 and 9 9, respectively, of Fig. 5ᵃ.
Figure 9:
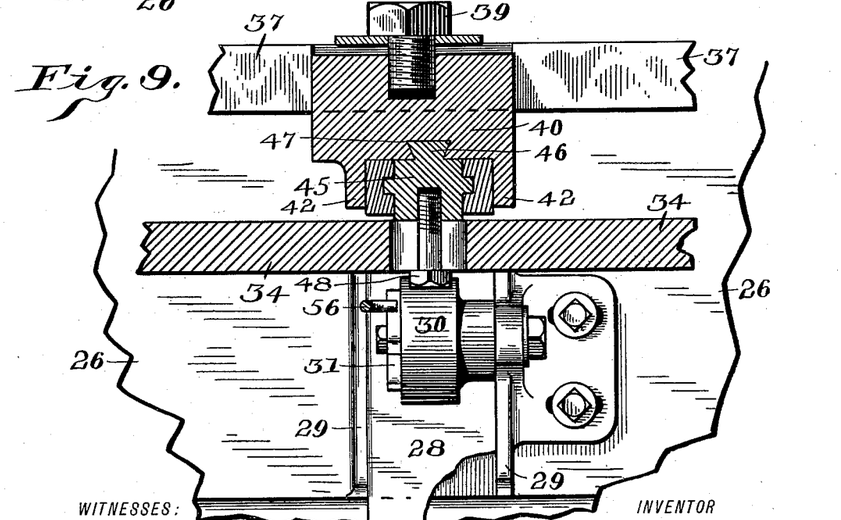
Figures 10, 11:
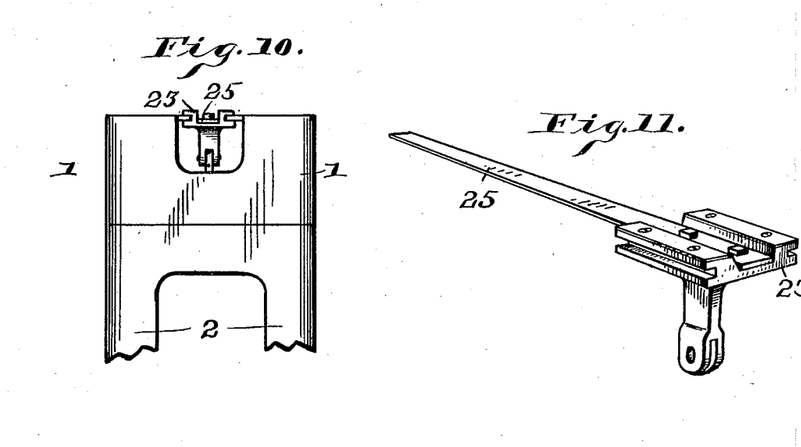
Fig. 10, a detail of the end of the bed of the machine looking from the line 10 10 of Fig. 2.
Fig. 11, a detail in perspective of the bar and its carriage for pushing the plugs of tobacco out of the hopper into which they are placed into position under the tagging-heads.
Figure 12:
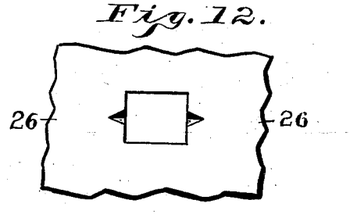
Fig. 12, a detail in plan view of the die-plate looking from the line 12 12 of Fig. 5.
Figure 13:
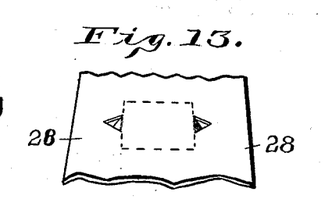
Fig. 13, a view in perspective of the sheet after the spur has been punched and showing the outline of the tag in dotted lines.
Figure 14:
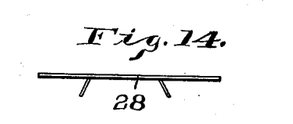
Figure 15:
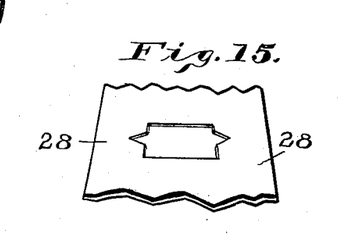

27 are the openings, which are of the size and shape of the desired tags, and over them the sheets or strips 28, preferably of metal and generally tin, out of which the tags are to be made are fed. The drawings (see Figs. 7 and 9) represent this material for the tags as being in strips, which are fed between guiding-flanges 29. One of the flanges will be adjustable to permit variable widths of strips to be used.

30 are feed-wheels, one for each strip of blank material. They will preferably be faced with rubber and will be rotated in the direction and at the requisite speed to supply new material for tags as fast as needed. The feed-wheel and the adjustable flange for guiding the blank are mounted on the same base.

31 is a ratchet-wheel which turns with the feed-wheel and through which movement is transmitted to the feed-wheel in the manner which will hereinafter be described.

32 are eccentrics mounted on the shaft 5, and 33 are eccentric-rings working on the said eccentrics.

34 is a plate, the ends of which enter vertical ways in the standards 4 4 and permit a vertical transverse movement of the plate, which movement is imparted to it by the eccentrics 32 acting through the rings 33, with which the plate is connected.

34ª are connecting-rods which are rigidly secured at one of their ends to the eccentric-rings and at their opposite ends are secured by knuckle-joints 35 to the plate. These connecting-rods are each in two sections, with threaded longitudinal openings, into which bolts 36, with right and left hand threads, are screwed. This construction permits an adjustment of the length of the connecting-rods.

37 is a bar which is bolted to the standards 4 in a position adjacent to and parallel with the plate 34. The bolt-holes through the plate ends are slotted to permit an adjustment of the distance between the bar and the plate. The bar is provided with the longitudinal slot 38, into which the flanged extensions 39 of the heads 40 are projected. The slot permits the placing of the heads at any desired position longitudinally of the bar, and the heads will be held in place by the washer and screw-bolt 41. The front face of the head, opposite the flange 39, has the two vertical and parallel flanges 42, which form guides for a bifurcated longitudinally-reciprocating foot 43, which is brought into contact with the underlying sheet of metal from which the tag is to be made and is provided with punches which cut the spurs for the tag, as will be more fully explained hereinafter. The two stems of the bifurcated foot are grooved longitudinally on the inner adjacent sides, (see Fig. 9,) and the cross-bar 44, which connects the tops of the stems, (see Figs. 5 and 6,) is cut away on the side next the head 40 to permit the punch 45 to pass down through the opening thus provided. The punch has longitudinal side flanges which enter the grooves in the stems of the foot 43. It also has a dovetailed tongue 46, which works in a corresponding dovetailed groove 47 in the head 40. The punch is continued out in thickness under the cross-bar 44 into contact with the vertically-reciprocating plate 34, to which plate the punch is bolted by means of the screw-bolts 48. The head is bolted to the slotted bar 37 and the punch to the plate 34 in exact position to cause the punch when it is lowered to enter one of the openings 27 in the plate 26, and the downward movement of the plate which carries the punches is carefully regulated to cause the bottom of the punch to approach within the thickness of the tag to the plug of tobacco and then begin its return movement. The upper end of the punch is continued above the cross-bar 44 a suitable distance and has a spring 49 bolted to its end. This spring has a bearing at its other end against the cross-bar 44 and holds said bar constantly against the shoulder formed by the lower expanded thickness of the punch except during the downward movement of the foot 43 and the punch, when the foot reaches the plate 26 and is arrested, the tension of the spring is overcome, and the punch continues down into the opening 27 in the plate, while the foot stops at the mouth of the opening. The upper end of the punch is also provided with the lateral extension or arm 50, to which the dog 51 is pivotally secured. The lower end of the dog is notched to engage the adjacent corner of the foot 43, as shown in Fig. 3 and in dotted lines in Fig. 5ª, and is pressed constantly against the foot by the spring 52. The lower end of the dog is beveled from the notch out for the purpose of throwing the dog away from the foot when the latter reaches the plate 26, where it must stop on its downward movement by the contact of said beveled end with the stud-pin 53, located in the path of the vertically-reciprocating dog.

54 are punches of proper shape to cut the triangular spur on the proposed tag. These punches are on the under side of the ends of the bifurcated foot, and they work into correspondingly-shaped and suitably-placed notches in the sides of the openings 27. The spurs only are cut by the punches 54. The remainder of the tag is punched out by the punch 45, which follows immediately after. The spurs, however, are bent down by the punches 54 to an angle of about forty-five degrees and are from thence brought into the required position at right angles to the body of the tag by contact with inwardly and downwardly contracting notches 27ª in the openings 27 as the tag is pushed on through by the punch after it has been cut out of the sheet.

Brackets 55 are attached to the plate 34, and to each of these the spring-hooks 56 are adjustably attached in right position to engage the hooked teeth on the ratchet-wheels 31 on the feed-wheels 30 and rotate the wheels and feed the metal strips in under the punches as required.

There will be as many of the tag punching and affixing heads on the machine as there are tags to be affixed to each plug of tobacco, whereby by one downward movement of the plate 34 all of the required number of tags will be simultaneously punched out and affixed to the tobacco.

Figure 1:
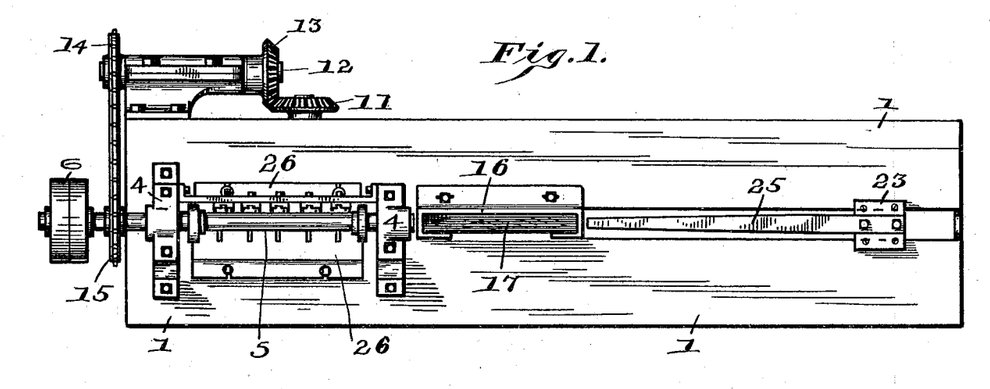
Figure 1 is a plan view of my improved machine.
Figure 2:
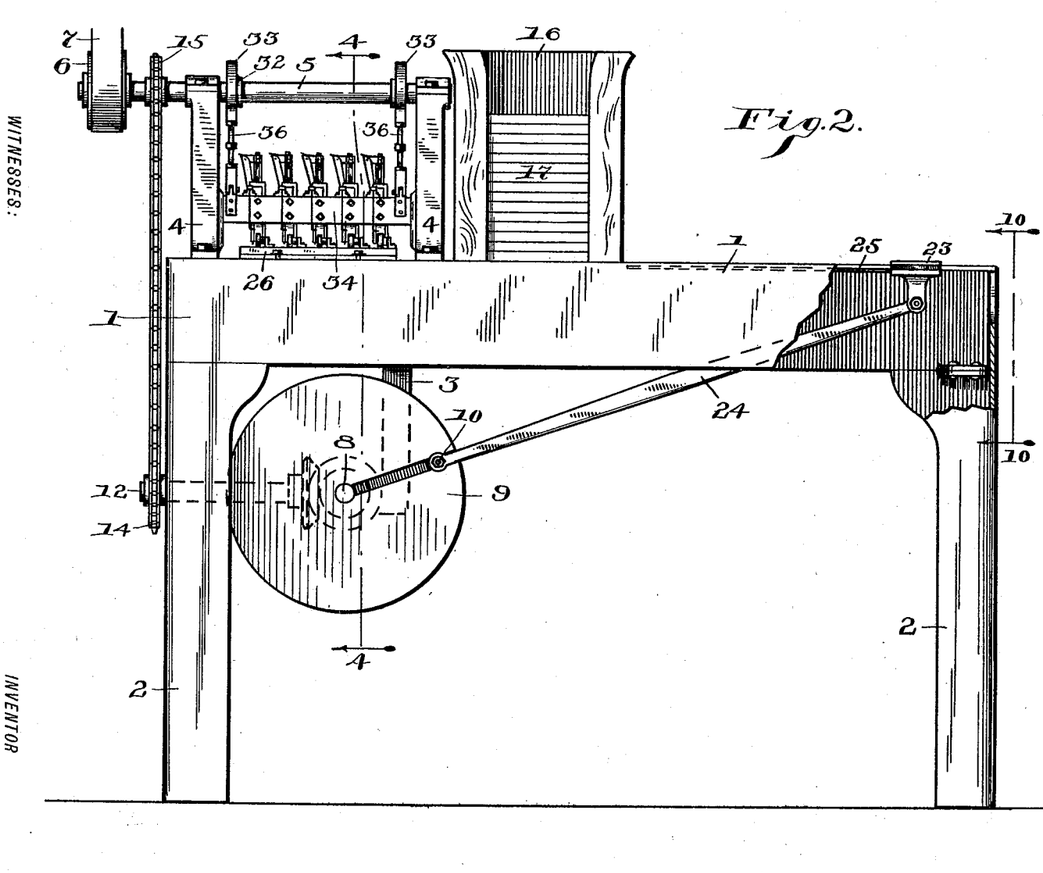
Fig. 2, a front side elevation with the frame or bed of the machine partially in section.
Figure 4:
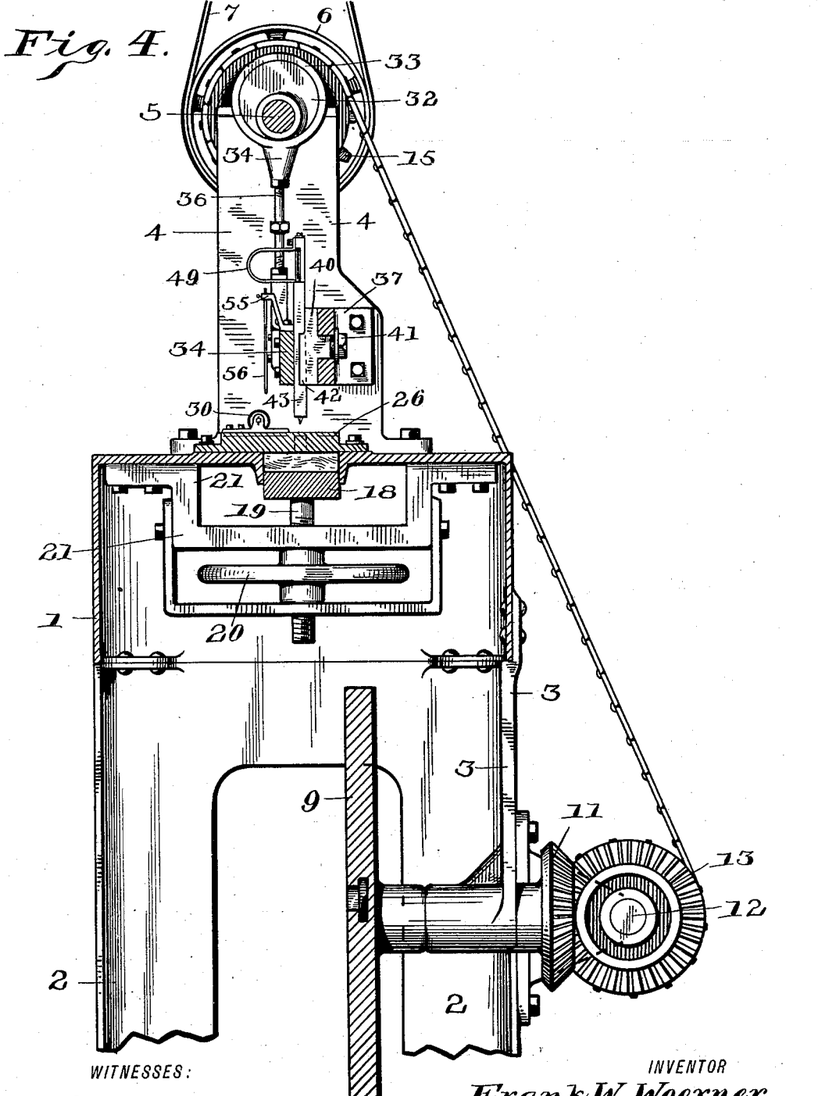
Fig. 4, a vertical section on the line 4 4 of Fig. 2 looking in the direction of the arrows.
Figure 5:
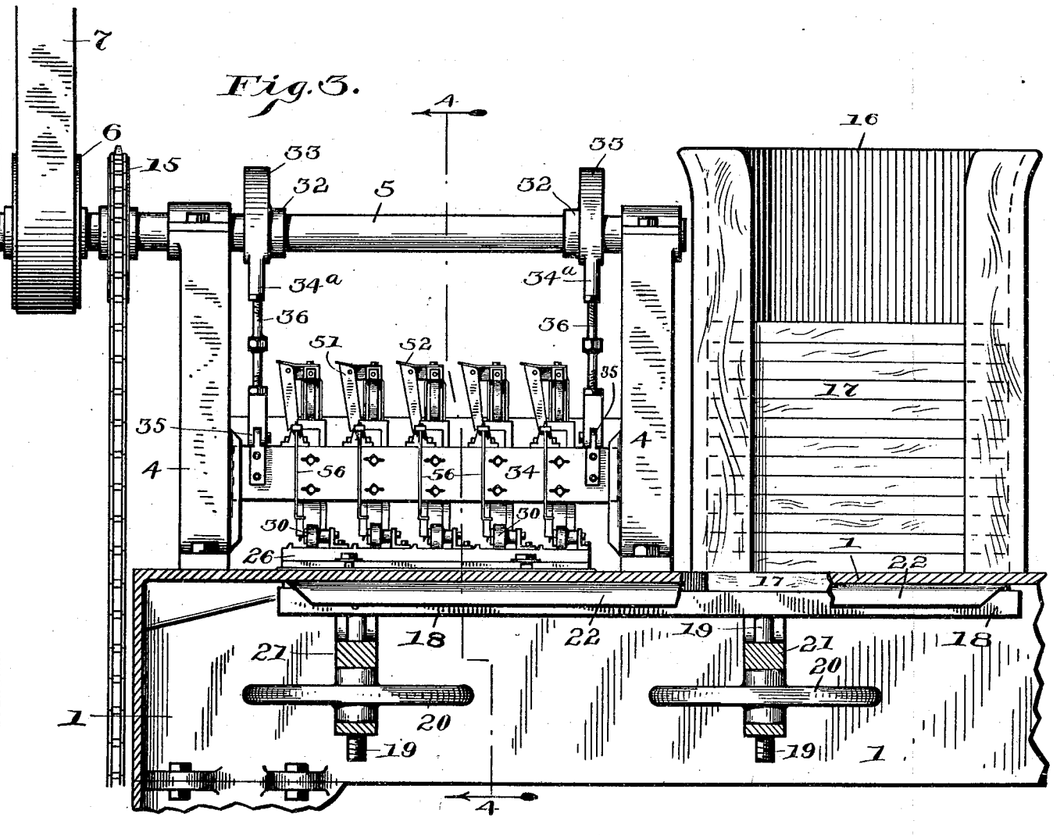
Fig. 5, an enlarged detail of the head for stamping the tag and pressing it onto the tobacco, looking from the line 5 5 of Fig. 7 in the direction of the arrows. The view shows the head in that position of its parts immediately after the spurs of the tag have been formed, but before the body of the tag has been stamped out.
Figure 5A:
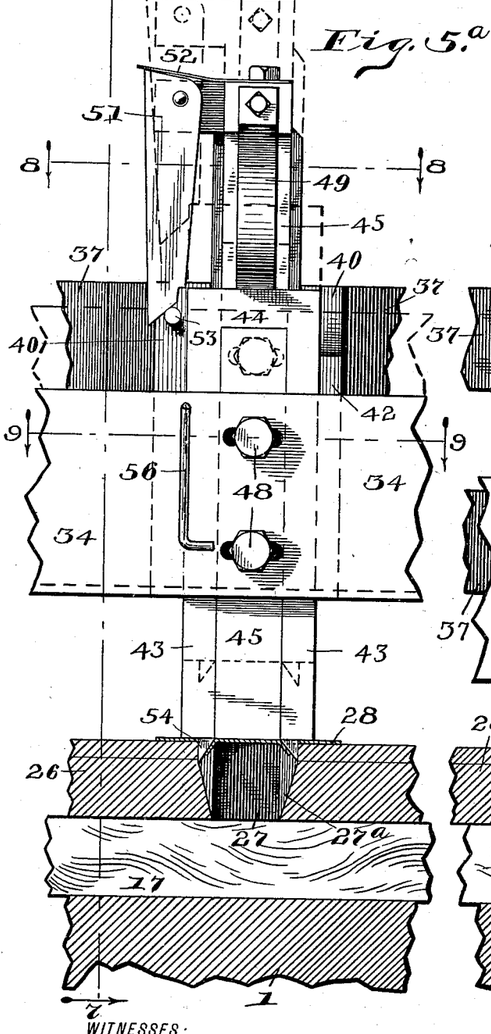
Figure 6:
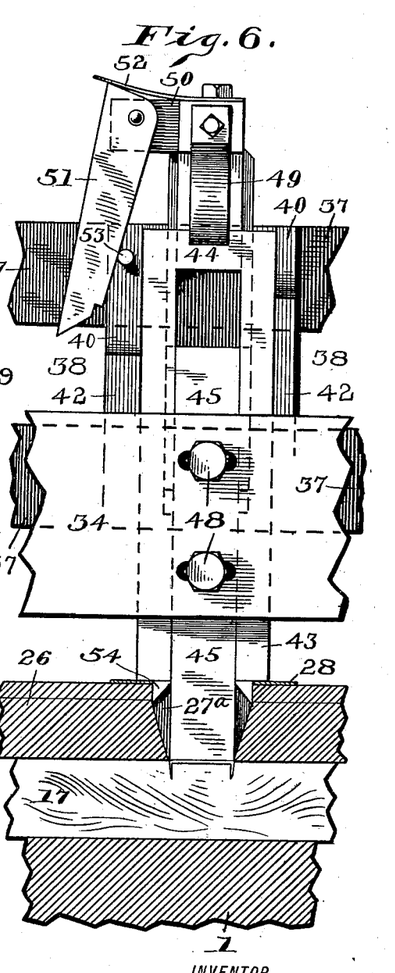
Fig. 6, a view of the head with its parts in the position assumed after the tag has been formed and affixed to the plug and before the return movement of the several parts.

Assuming that the machine is in the position shown in Figs. 3, 4, and 5 and in dotted lines in Fig. 5ª—that is, with the plate 34 at the highest position of its stroke—the operation of forming the tag and affixing it to the plug of tobacco is as follows: The plate 34 by the action of the eccentrics 32 begins to move down and carries with it the punch 45, and because of the connection of the punch with the foot 43 by means of the dog 51 the foot will also be carried down onto the strip of metal 28, cutting out the spurs, immediately after which the dog is thrown out of engagement with the foot, allowing the latter to remain to hold the strip while the punch moves on down, finishing the tag and pressing it through the opening 27 into the plug of tobacco. The spring 49 keeps the foot constantly against the strip of metal until it is lifted by the expanded portion of the punch on the upward or return movement of the latter. With the upward movement of the plate 34 the hook 56 is raised and the feed-wheel revolved, whereby a new portion of the metal strip is fed under the punch ready for the tag for the next plug of tobacco.

Having thus fully described my invention, what I claim as new, and wish to secure by Letters Patent of the United States, is—

1. In a machine for simultaneously forming and affixing a plurality of tags from separate strips of metal to plug-tobacco, fixed standards having grooved ways on one side, a reciprocating plate, punches secured to and moving with the plate through the grooved standards, independent foot-pieces secured by a pivoted dog to said punches and having auxiliary under side spurs or projections to form the spurs for the tags, and a dog to connect the foot-pieces with the punches and means for feeding strips of sheet metal to the punches and for supplying the tobacco to be tagged, substantially as described and specified.

2. The combination, with a die having downwardly-tapering notches, of a bifurcated foot with under side punches to enter the notches in the die, a punch working longitudinally between the two stems of the foot, said punch extending above the foot and having an expanded portion forming a shoulder under the cross-bar of the foot, a spring fastened to the top of the punch and pressing down on the foot, a dog pivotally secured to the upper end of the punch and engaging the bifurcated foot, said dog being held in engagement by a spring, a stud-pin in the path of the dog to throw it out of engagement with the bifurcated foot and a vertically-reciprocating plate to which the punch which forms the body of the tag, is fastened, all substantially as described and specified.

3. In a tagging-machine, a plate having dies, punches working in the dies, a hopper open at its bottom, into which plugs of tobacco are deposited, a support under the hopper extending also under the die-plate and adjustable in its distance from the bottom of the hopper and from the plate, tag forming and affixing mechanism and a bar reciprocating synchronously with the tag forming and affixing mechanism, between the hopper and the support for the plugs, and adjustable in the length of its stroke all substantially as and for the purposes specified.

4. The combination, with a hopper open at its bottom, a plate with dies alongside the hopper, an adjustable support underneath the plate and the hopper adjustable in its distance from said plate, a reciprocating carriage having a push-bar working between the support and the hopper, a revoluble shaft having eccentrics, a plate connected with the eccentrics, punches secured to the plate and working in the dies in the die-plate, bifurcated foot-piece for each punch actuated by dog connection with the punch, said foot-piece having punches to form the spurs for the tags stud-pins in the paths of the dogs to throw them out of engagement with the foot-pieces, and a feed-wheel actuated from the reciprocating plate which carries the punches, said wheel automatically feeding the sheet metal under the punches as required to form the tags, all substantially as described and for the purposes specified.

5. In a tagging-machine, the combination of the fixed frame, a reciprocating plate or frame therein, punches secured to and moving with said reciprocating plate, independent foot-pieces secured by a catch to said punches and having auxiliary punches to form the spurs on the tags, said catch, means for tripping it to release said foot-piece from the punch at the proper point in the operation, the dies, means for feeding the strap of metal, and means for feeding the plugs of tobacco to the machine, all substantially as shown and described.

In witness whereof I have hereunto set my hand and seal at Indianapolis, Indiana, this 29th day of October, A. D. 1897.

FRANK W. WOERNER. [L. S.]

Witnesses:
JOSEPH A. MINTURN,
CARL SCHLEGEL.